United States Patent
Shimbo et al.

(10) Patent No.: US 9,677,938 B2
(45) Date of Patent: Jun. 13, 2017

(54) SPECTRAL CHARACTERISTIC ACQUISITION DEVICE, IMAGE EVALUATION DEVICE, AND IMAGE FORMATION APPARATUS

(71) Applicants: Kohei Shimbo, Kanagawa (JP);
Naohiro Kamijo, Kanagawa (JP);
Yoichi Kubota, Tokyo (JP)

(72) Inventors: Kohei Shimbo, Kanagawa (JP);
Naohiro Kamijo, Kanagawa (JP);
Yoichi Kubota, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 408 days.

(21) Appl. No.: 14/272,705

(22) Filed: May 8, 2014

(65) Prior Publication Data
US 2014/0333927 A1 Nov. 13, 2014

(30) Foreign Application Priority Data

May 10, 2013 (JP) .................................. 2013-099855
Oct. 23, 2013 (JP) .................................. 2013-220109

(51) Int. Cl.
*G01J 3/40* (2006.01)
*G03G 15/00* (2006.01)
(Continued)

(52) U.S. Cl.
CPC .............. *G01J 3/2823* (2013.01); *G01J 3/04* (2013.01); *G01J 3/18* (2013.01); *G03G 15/55* (2013.01);
(Continued)

(58) Field of Classification Search
CPC .... G01J 3/2823; G01J 3/18; G01J 3/04; G01J 2003/045; G01J 2003/2826
See application file for complete search history.

(56) References Cited

U.S. PATENT DOCUMENTS 5,064,290 A * 11/1991 McMurtry ............... G01D 5/38
250/231.16
5,724,135 A * 3/1998 Bernhardt ............. G01J 3/2823
356/328
(Continued)

FOREIGN PATENT DOCUMENTS

JP 2011-080980 4/2011
WO 02/050783 A1 6/2002

OTHER PUBLICATIONS

Susumu Moriya, "Imaging Spectrometer (ImSpector)", Journal "Light Alliance", Japan Industrial Publishing Co., Ltd., Nov. 1999, pp. 4-9.
(Continued)

*Primary Examiner* — Kara E Geisel
*Assistant Examiner* — Dominic J Bologna
(74) *Attorney, Agent, or Firm* — IPUSA, PLLC

(57) ABSTRACT

A spectral characteristic acquisition device includes a member configured to have a plurality of openings arrayed in a predetermined direction, each of the plurality of openings inclined with respect to the predetermined direction, the plurality of openings being configured to pass light beams from a plurality of positions on an object therethrough, a spectrally dispersing part configured to spectrally disperse the light beams having passed through the plurality of openings in a direction orthogonal to the predetermined direction, and a plurality of one-dimensional image capturing parts provided at a predetermined interval in a plurality of lines and configured to be irradiated with the light beams having been spectrally dispersed by the spectrally dispersing part, a plurality of pixels of the plurality of one-dimensional image capturing parts being arrayed in a direction parallel to the predetermined direction.

11 Claims, 12 Drawing Sheets

(51) Int. Cl.
  *G01J 3/28* (2006.01)
  *G01J 3/04* (2006.01)
  *G01J 3/18* (2006.01)

(52) U.S. Cl.
  CPC . *G01J 2003/045* (2013.01); *G01J 2003/2826* (2013.01); *G03G 2215/00616* (2013.01)

(56) References Cited

U.S. PATENT DOCUMENTS

| | | | |
|---|---|---|---|
| 6,061,121 A * | 5/2000 | Holl | G01N 21/84 250/271 |
| 7,057,723 B2 | 6/2006 | Klock et al. | |
| 8,018,799 B2 * | 9/2011 | Matsubara | G11B 7/1275 369/100 |
| 8,497,988 B2 | 7/2013 | Shimbo et al. | |
| 8,559,005 B2 | 10/2013 | Shimbo et al. | |
| 2003/0025974 A1* | 2/2003 | Mushiake | G02B 26/105 359/205.1 |
| 2003/0223248 A1* | 12/2003 | Cronin | G01J 3/10 362/555 |
| 2010/0296084 A1* | 11/2010 | Berg | G01N 21/896 356/239.1 |
| 2011/0063615 A1* | 3/2011 | Shimbo | G01J 3/02 356/326 |
| 2011/0106472 A1* | 5/2011 | Seo | G01J 3/02 702/76 |
| 2011/0299104 A1* | 12/2011 | Seo | G01J 3/02 358/1.9 |
| 2013/0063723 A1 | 3/2013 | Shimbo et al. | |
| 2013/0235249 A1 | 9/2013 | Shimbo et al. | |
| 2013/0235376 A1 | 9/2013 | Kamijo et al. | |

OTHER PUBLICATIONS

Norimichi Tsumura et al., "Estimation of Spectral Reflectances from Multi-Band Images by Multiple Regression Analysis", Japanese Journal of Optics vol. 27 No. 7. 1998, pp. 384-391.

* cited by examiner

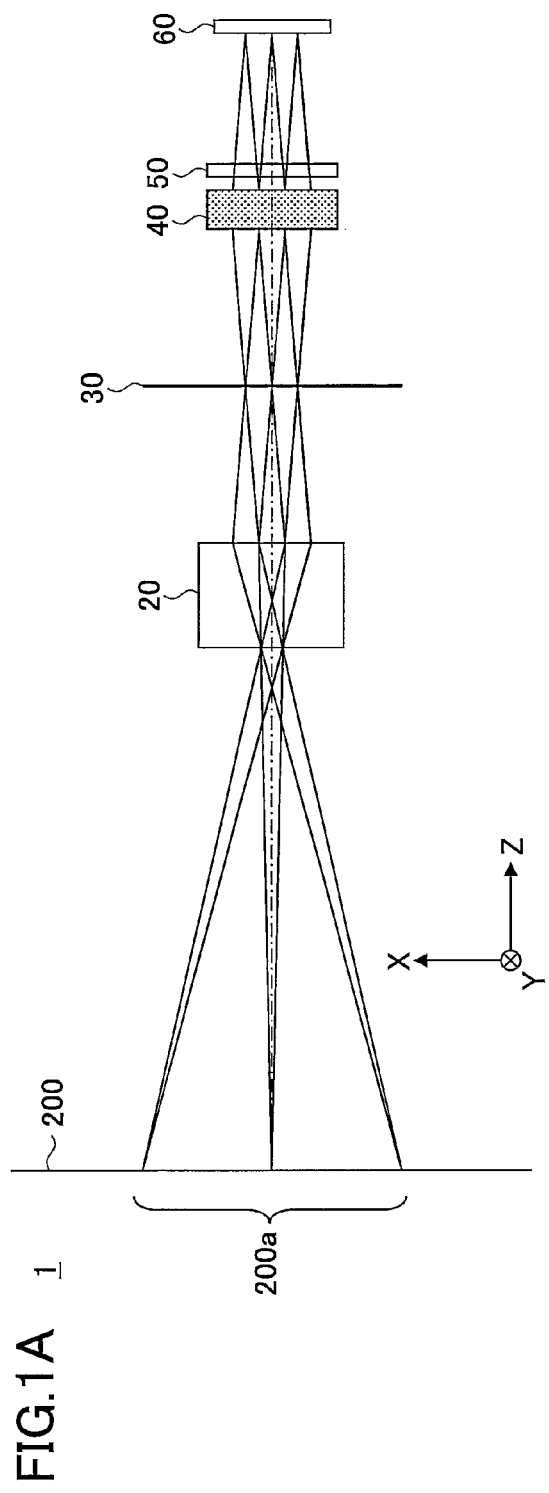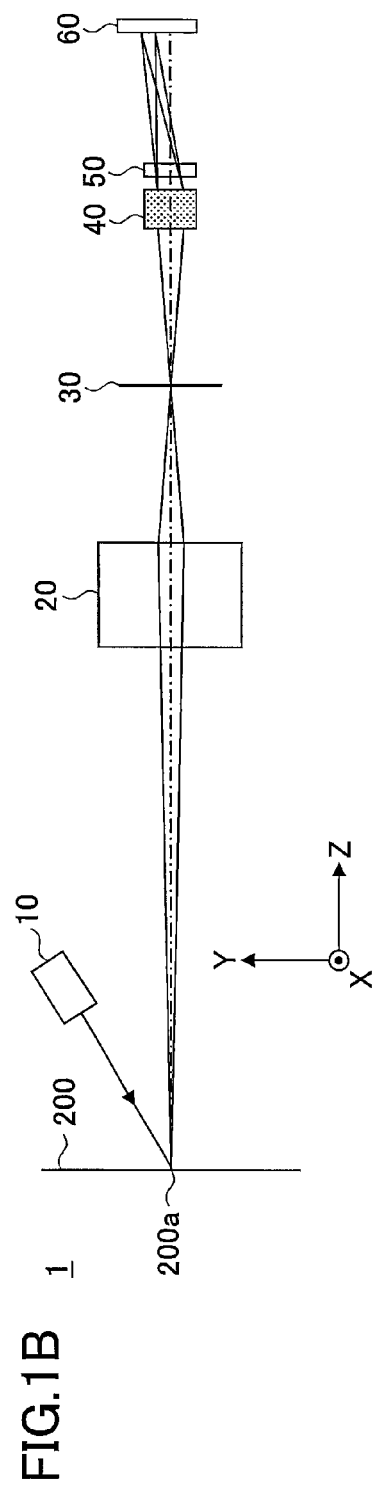
FIG.1A
FIG.1B

FIG.2
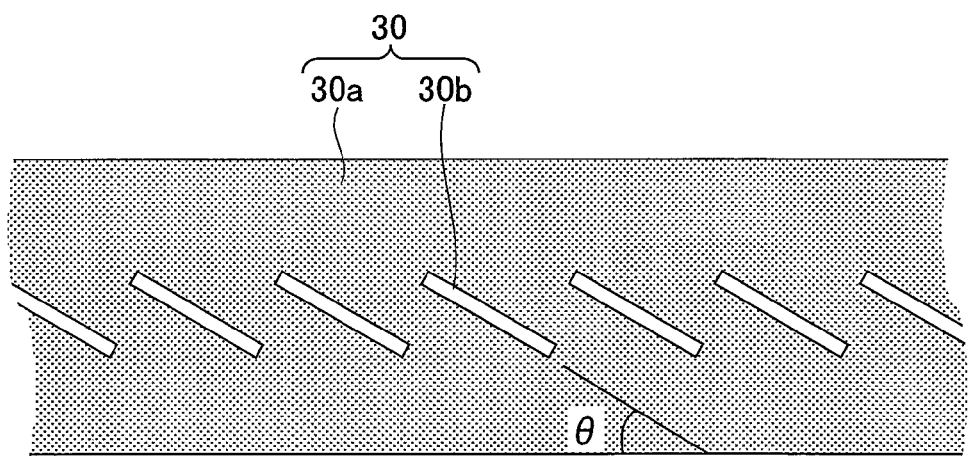
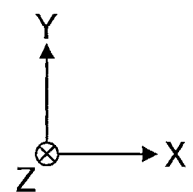

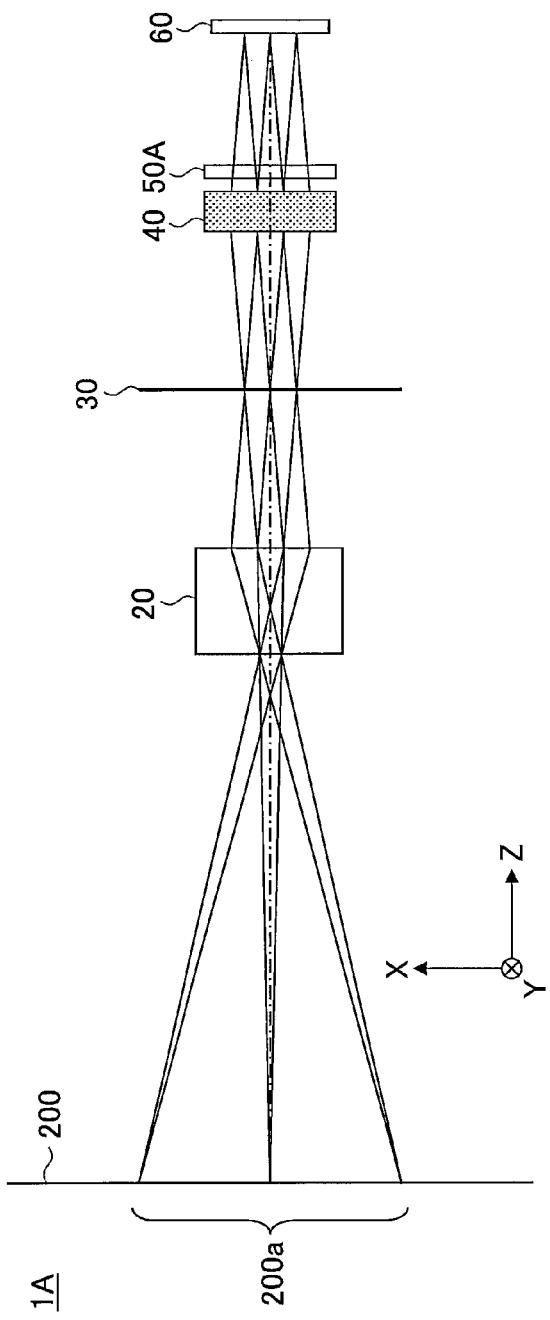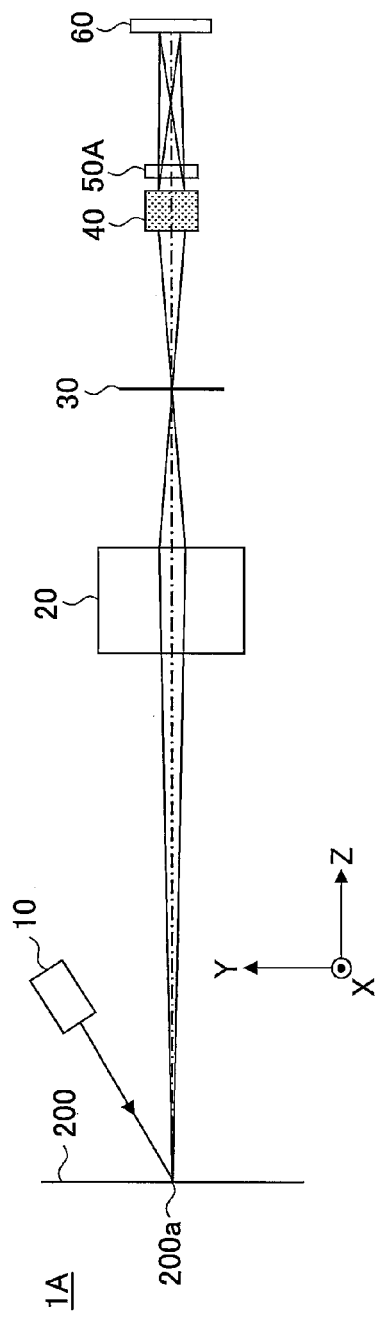
FIG.4A
FIG.4B

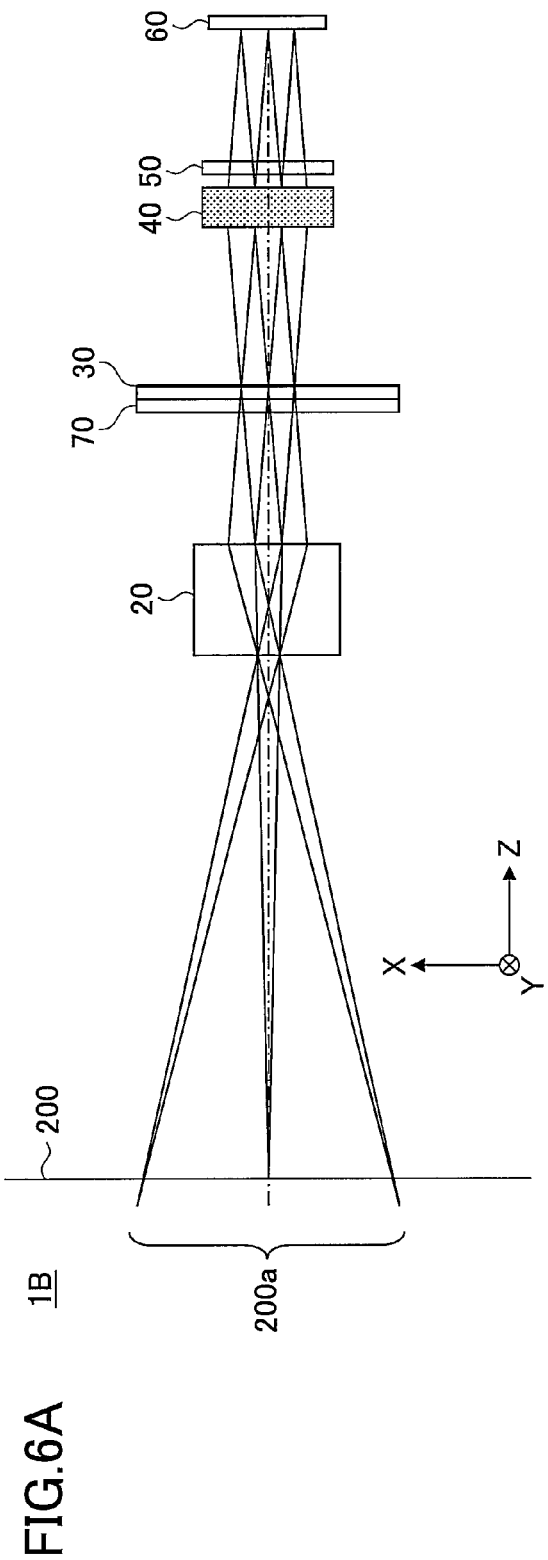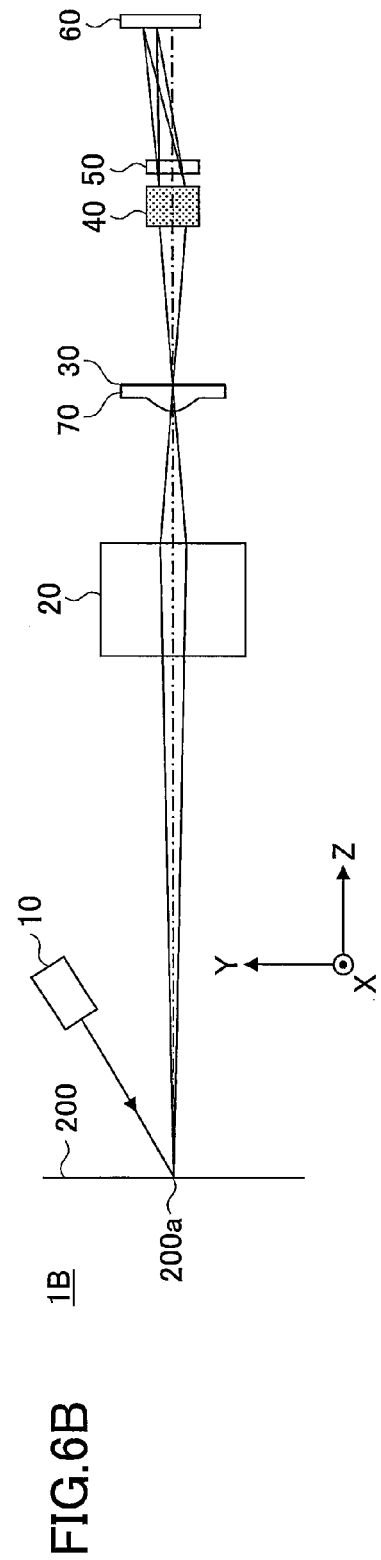
FIG.6A
FIG.6B

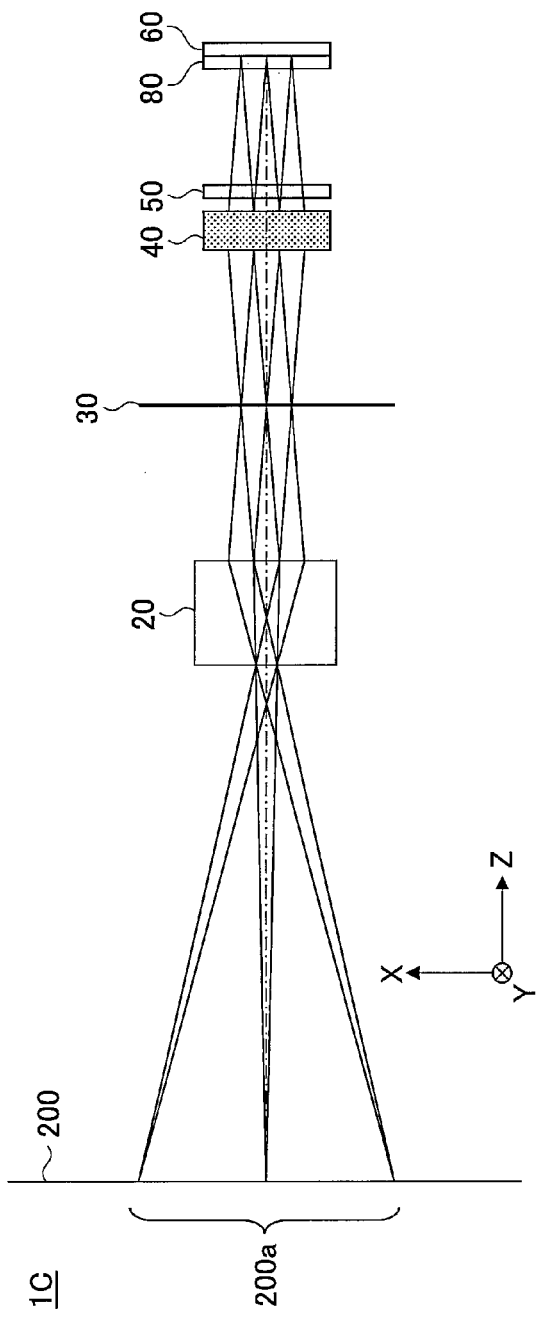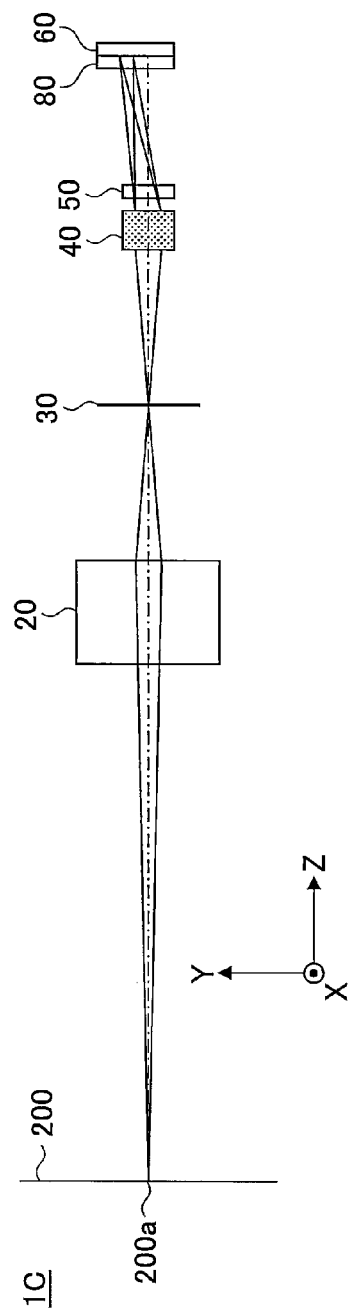
FIG.7A
FIG.7B

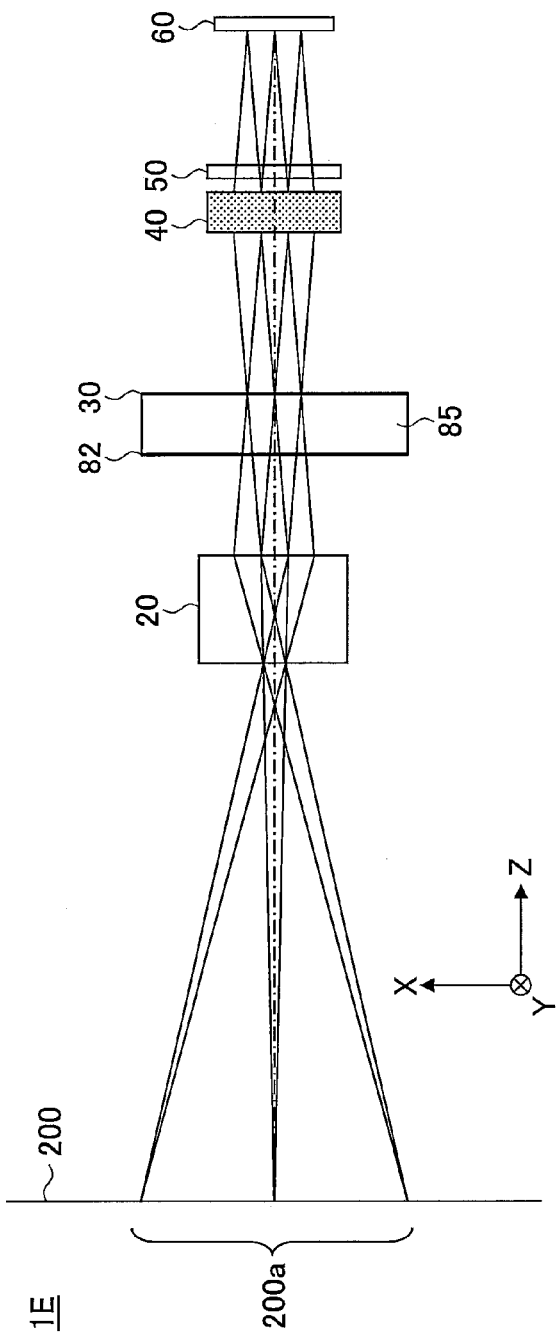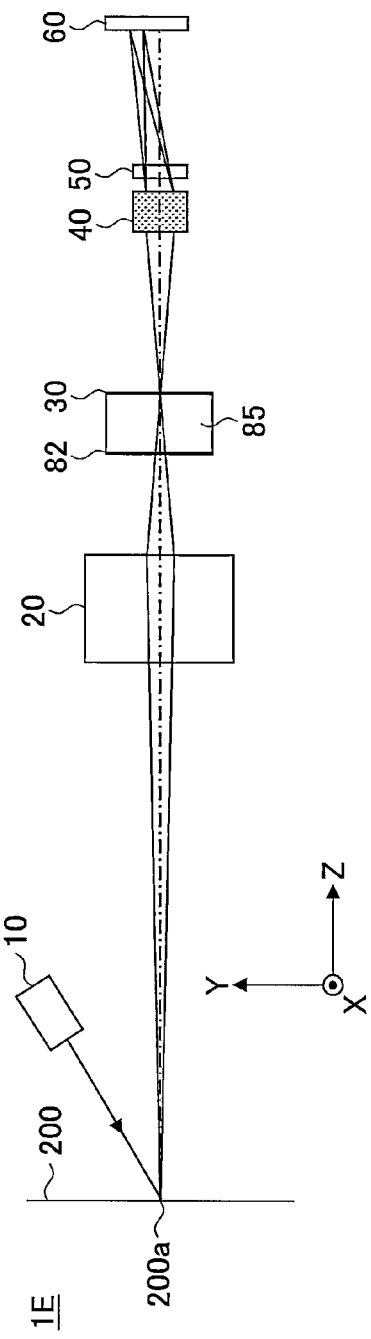

SPECTRAL CHARACTERISTIC ACQUISITION DEVICE, IMAGE EVALUATION DEVICE, AND IMAGE FORMATION APPARATUS

BACKGROUND OF THE INVENTION

1. Field of the Invention

An aspect of the present invention relates to at least one of a spectral characteristic acquisition device, an image evaluation device, and an image formation apparatus.

2. Description of the Related Art

In a field of Production Printing, it becomes general to produce prints by an electrophotographic-type or an ink-jet-type printer so that prints are provided as a small batch and in a short delivery time. Then, an image quality similar to that of a conventional offset printing machine is also desired for these printers. Therefore, a color sensing technique for measuring a color at each position of a printed image at a high precision becomes important in order to improve color stability or color reproducibility of an image.

Herein, a spectral characteristic acquisition device capable of acquiring spectral information at 6-31 channels that is more than 3 channels of RGB, calculating a spectral reflectance therefrom, and further calculating color information such as CIE LAB is effective for color sensing at a high precision. Furthermore, a spectral characteristic acquisition device that arrays a plurality of spectrometric sensors in one line, conveys an object to be measured in a direction orthogonal thereto, and conducts sensing in parallel is effective in order to conduct color sensing at a plurality of points on an entire image area.

For one example of such a spectral characteristic acquisition device, it is known that a light beam condensed by a first imaging optical system is spatially limited by an opening sequence such as a slit array, is imaged by a second imaging optical system, and spectrally dispersed by a diffraction element having a diffraction axis in a direction oblique with respect to a direction of arraying of such a slit array.

In such a spectral characteristic acquisition device, spectral characteristics at a plurality of positions are acquired from signals of a plurality of pixels corresponding to respective diffraction images by acquiring spectrally dispersed light beams on a one-dimensional image capturing element (for example, see International Publication No. 02/50783). Because such a spectral characteristic acquisition device uses a one-dimensional image capturing element, a transfer time of an acquired signal is short and a measurement time is short so that it is preferable to measure an image conveyed at a high speed.

Here, a spectral characteristic acquisition device using a two-dimensional image capturing element is unsuitable for sensing of an image conveyed at a high speed, as is required to measure, for example, 1000 times or more for 1 second, because it takes time to transfer an acquired signal.

It is necessary to increase the number of pixels of a one-dimensional image capturing element assigned to each spectrometric sensor in order to provide each spectrometric sensor with a high precision in the aforementioned spectral characteristic acquisition device, however, if so, the number of spectrometric sensors capable of being realized in one one-dimensional image capturing sensor is decreased. That is, there is a trade-off relationship between a precision of each spectrometric sensor and the number of the spectrometric sensors. A case where the number of spectrometric sensors is large is industrially useful, because it is possible to measure a broader range and measure at a higher density.

SUMMARY OF THE INVENTION

According to one aspect of the present invention, there is provided a spectral characteristic acquisition device, including a member configured to have a plurality of openings arrayed in a predetermined direction, each of the plurality of openings inclined with respect to the predetermined direction, the plurality of openings being configured to pass light beams from a plurality of positions on an object therethrough, a spectrally dispersing part configured to spectrally disperse the light beams having passed through the plurality of openings in a direction orthogonal to the predetermined direction, and a plurality of one-dimensional image capturing parts provided at a predetermined interval in a plurality of lines and configured to be irradiated with the light beams having been spectrally dispersed by the spectrally dispersing part, a plurality of pixels of the plurality of one-dimensional image capturing parts being arrayed in a direction parallel to the predetermined direction.

According to another aspect of the present invention, there is provided an image evaluation device, including the spectral characteristic acquisition device as described above, a conveyance part configured to move at least one of the spectral characteristic acquisition device and the object, and an image evaluation part configured to cooperate the spectral characteristic acquisition device with the conveyance part to acquire a spectral characteristic of an entire surface of the object.

According to another aspect of the present invention, there is provided an image formation apparatus, including a photoconductor body, a scanning optical system configured to expose the photoconductor body to light to form an image on the photoconductor body, a transfer body configured to transfer the image from the photoconductor body to an object, a fixation device configured to fix the image on the object, and the image evaluation device as described above being provided in back of the fixation device.

BRIEF DESCRIPTION OF THE DRAWINGS

FIG. 1A and FIG. 1B are cross-sectional diagrams that illustrate a spectral characteristic acquisition device according to a first embodiment.

FIG. 2 is a diagram that illustrates an oblique slit array.

FIG. 4A and FIG. 4B are cross-sectional diagrams that illustrate a spectral characteristic acquisition device according to a second embodiment.

FIG. 6A and FIG. 6B are cross-sectional diagrams that illustrate a spectral characteristic acquisition device according to a third embodiment.

FIG. 7A and FIG. 7B are cross-sectional diagrams that illustrate a spectral characteristic acquisition device according to a fourth embodiment.

FIG. 11A and FIG. 11B are cross-sectional diagrams that illustrate a spectral characteristic acquisition device according to variation example 2 in the fifth embodiment.

DETAILED DESCRIPTION OF THE PREFERRED EMBODIMENTS

Figure 3:
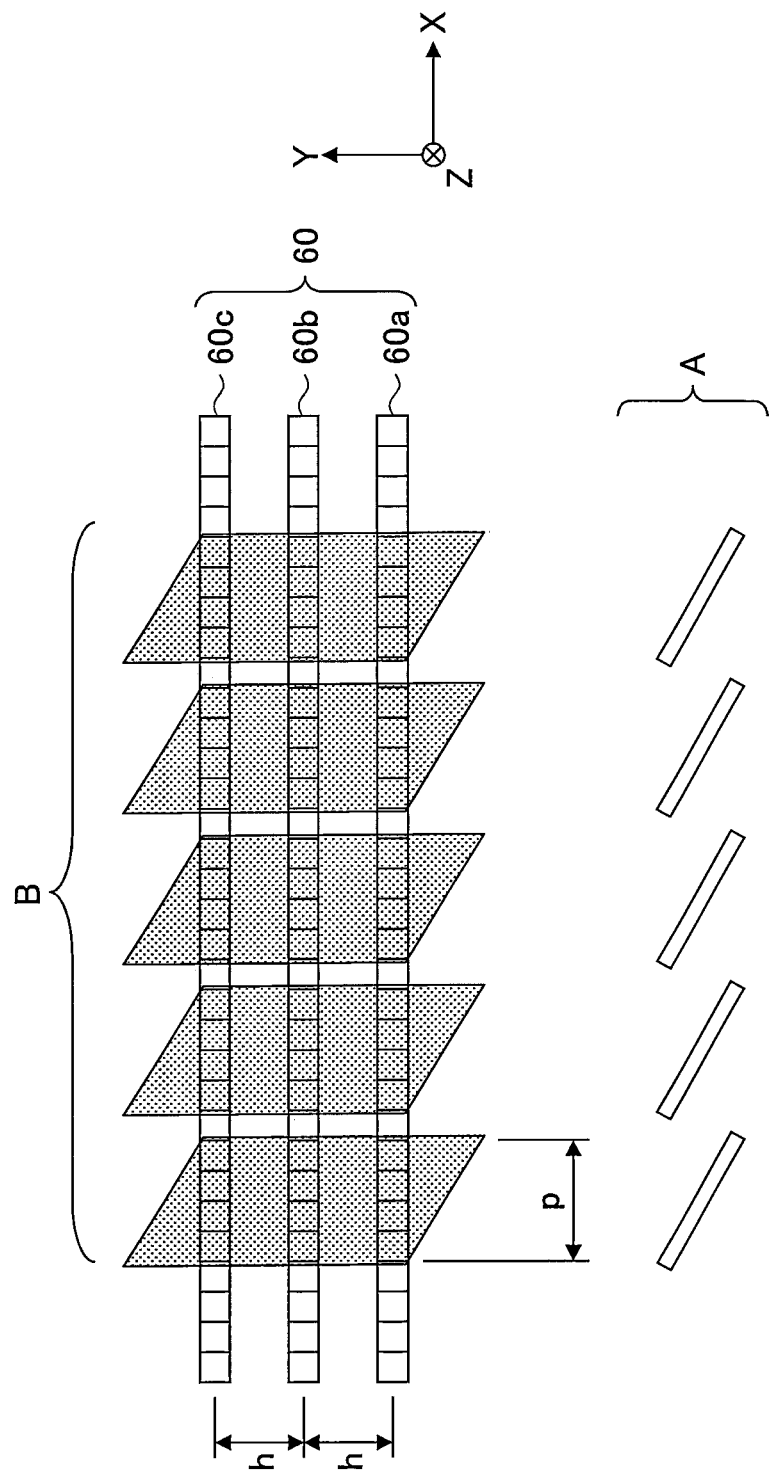
FIG. 3 is a diagram that illustrates a relationship between a light receiving element and a diffraction image.

Embodiments for implementing an invention will be described with reference to the drawings below. In each drawing, an identical reference numeral may be attached to an identical component to omit a redundant description.

First Embodiment

FIG. 1A and FIG. 1B illustrate a spectral characteristic acquisition device according to a first embodiment, wherein FIG. 1A illustrates a X-Z cross section and FIG. 1B illustrates a Y-Z cross section. With reference to FIG. 1A and FIG. 1B, a spectral characteristic acquisition device 1 has a light source 10, first imaging device 20, an oblique slit array 30, second imaging device 40, a diffraction element 50, and a light receiving element 60. Here, illustration of the light source 10 is omitted in FIG. 1A.

In FIG. 1A and FIG. 1B, an object 200 that is an object to be measured (such as a print) is conveyed at a constant speed in a direction of a Y-axis. A measurement area 200a is provided in a range of measurement that has a predetermined width in, at least, a direction of an X-axis. The measurement area 200a may be an entire width of the object 200. It is possible for the spectral characteristic acquisition device 1 to acquire a spectral characteristic at a plurality of positions in the measurement area 200a of the object 200 simultaneously.

The light source 10 is, for example, a line illumination light source that illuminates the measurement area 200a of the object 200 in a direction inclined by about 45 degrees with respect to a direction of a normal of the object 200. For the light source 10, it is possible to use, for example, a white Light Emitting Diode (LED) array that has an intensity, for example, over an approximately entire range of visible light. For the light source 10, a fluorescent lighting such as a cold-cathode tube, a lamp light source, or the like, may be used.

However, it is preferable for the light source 10 to emit light in a wavelength range necessary for a spectral dispersion and be capable of illuminating the measurement area 200a homogeneously. Here, a collimator lens that has a function of collimating light emitted from the light source 10 and irradiating the object 200 therewith (as parallel light) may be added to an optical system that composes the spectral characteristic acquisition device 1.

The first imaging device 20 have a function of imaging light (a light beam) reflected from the measurement area 200a of the object 200 onto the oblique slit array 30. It is possible to realize the first imaging device 20 by, for example, a single lens or a plurality of lenses, or a combination of an aperture and a single lens or a plurality of lenses.

The oblique slit array 30 is, for example, a member in which a plurality of openings 30b are arrayed at a predetermined pitch in a direction of an X-axis on a glass substrate 30a with a shading film provided on a surface thereof, as illustrated in FIG. 2. It is possible for each opening 30b to be shaped into, for example, a slit shape wherein its longitudinal direction (long axis) is inclined by a predetermined inclination angle θ with respect to a direction of an X-axis.

A light beam that has passed through each opening 30b of the oblique slit array 30 is a sampled light beam reflected from each of different positions on the measurement area 200a of the object 200.

A light beam that has passed through each opening 30b of the oblique slit array 30 is condensed by the second imaging device 40 again. Furthermore, a light beam that has passed through the second imaging device 40 is diffracted and spectrally dispersed by the diffraction element 50 in a direction of a Y-axis. A diffraction image that has been diffracted and spectrally dispersed by the diffraction element 50 in a direction of a Y-axis is imaged on the light receiving element 60 in which three one-dimensional line sensors are provided in parallel.

Here, the oblique slit array 30 is one representative example of an opening sequence according to an embodiment of the present invention and the diffraction element 50 is one representative example of spectrally dispersing device according to an embodiment of the present invention.

The light receiving element 60 is provided with a plurality of one-dimensional image capturing device at a predetermined interval in which a plurality of pixels are arrayed in a direction parallel to a predetermined direction. Specifically, for example, as illustrated in FIG. 3, a first pixel line 60a, a second pixel line 60b, and a third pixel line 60c, each of which is a plurality of pixels arrayed in a direction parallel to a direction of an X-axis are provided at an interval h (in a direction of a Y-axis) (arranged in parallel).

For the light receiving element 60, it is possible to use, for example, a Metal Oxide Semiconductor Device (MOS), a Complementary Metal Oxide Semiconductor Device (CMOS), or the like. For the light receiving element 60, a Charge Coupled Device (CCD) or the like may be used.

Here, when the first pixel line 60a, the second pixel line 60b, and the third pixel line 60c are arranged in such a manner that mutual long sides contact, a wavelength bands capable of being acquired by adjacent pixel lines may be too close. Therefore, it is preferable to arrange the first pixel line 60a, the second pixel line 60b, and the third pixel line 60c at a predetermined interval (in a direction of a Y-axis). While the first pixel line 60a, the second pixel line 60b, and the third pixel line 60c are arranged at a predetermined interval (in a direction of a Y-axis), a circuit for transferring a light signal received by each pixel or the like may be placed among the first pixel line 60a, the second pixel line 60b, and the third pixel line 60c.

Although the light receiving element 60 in which three pixel lines that are the first pixel line 60a, the second pixel line 60b, and the third pixel line 60c, each of which is one-dimensional image capturing device (a line sensor), are provided in parallel is illustrated in the present embodiment, no limitation to this configuration is provided. That is, it is sufficient to provide a plural number of one-dimensional image capturing device (line sensors) (two, four, or more thereof may be provided). Here, the light receiving element 60 is one representative example of plurality-of-lines image capturing device according to an embodiment of the present invention.

Furthermore, as illustrated in FIG. 3, each light beam that has passed through each opening 30b of the oblique slit array 30, has been condensed by the second imaging device 40, and has been diffracted by the diffraction element 50, is imaged as a zeroth order diffraction image A or a first order diffraction image B on a surface of the light receiving element 60 or in a neighborhood thereof.

In the present embodiment, a relative position of each optical component is adjusted in such a manner that the zeroth order diffraction image A is imaged on a place other than the light receiving element 60 and the first order diffraction image B intersects with the first pixel line 60a, second pixel line 60b, and third pixel line 60c of the light receiving element 60. Thus, each light beam that has been spectrally dispersed by the diffraction element 50 irradiates all of the first pixel line 60a, the second pixel line 60b, and the third pixel line 60c.

Because each opening 30b of the oblique slit array 30 is inclined by an inclination angle θ with respect to an X-axis and spectral dispersion is conducted by the diffraction element 50 in a direction of a Y-axis, a spectral characteristic of the first order diffraction image B incident on each pixel in each pixel line is different from a spectral characteristic on an adjacent pixel. Furthermore, a light beam incident on each pixel line also provides a different spectral characteristic.

It is possible to calculate a spectral characteristic such as a spectral reflectance based on signals of total twelve pixels of three pixel lines that receive signals of respective first order diffraction images B that correspond to respective openings 30b of the oblique slit array 30. It is possible to calculate a spectral reflectance by utilizing, for example, an existing method such as Wiener estimation.

Here, although the first order diffraction image B among diffraction images is captured by three pixel lines of the light receiving element 60 in the present embodiment, no limitation to this configuration is provided and it is also possible to use another order diffraction image such as a second order diffraction image in a similar manner. Then, for the diffraction element 50, it is preferable to use an improved diffraction efficiency of predetermined order diffraction light, specifically, a blazed diffraction element or the like.

Furthermore, although spectral dispersion is conducted by using the diffraction element 50 in the present embodiment, no limitation to this configuration is provided, and spectral dispersion may be conducted by using, for example, another element having a spectral dispersion function (spectrally dispersing device) such as a prism.

In the spectral characteristic acquisition device 1, it is preferable for the second imaging device 40 to have a configuration in such a manner that a plurality of erecting equal-magnification imaging elements are arrayed. For such an element, there is provided, for example, SELFOC LENS ARRAY (registered trademark) that is sold by Nippon Sheet Glass Company, Ltd. (and that will be referred to as an "SLA" below). An SLA is an optical system in which a multiplicity of gradient index (GRIN) lenses are arrayed to form one continuous image as a whole.

It is possible to image a conjugation length between the oblique slit array 30 and the light receiving element 60 as a length of about 10-60 mm by using an SLA. Therefore, the spectral characteristic acquisition device 1 is effectively miniaturized.

Because the spectral characteristic acquisition device 1 uses spectrally dispersing device, such as the diffraction element 50, to convert information of a wavelength of light into information of a position, a variation of a relative position between a diffraction image and the light receiving element 60 greatly influences a precision of a measurement of the spectral characteristic acquisition device 1. Then, a variation of a relative position that is caused by vibration, thermal expansion, or the like is readily reduced by miniaturization, and it is possible to realize the spectral characteristic acquisition device 1 with a higher stability.

Herein, it is desirable for the first imaging device 20 to have at least an image side telecentric characteristic. Because a chief ray of each light beam that has passed through the oblique slit array 30 is generally parallel to an optical axis by having an image side telecentric characteristic, a characteristic of each light beam incident on the second imaging device is homogenized. Because a characteristic of each spectrometric sensor that composes the spectral characteristic acquisition device 1 is homogenized thereby, it is possible to ensure a predetermined precision of a measurement in all of spectrometric sensors of the spectral characteristic acquisition device 1.

Here, it is possible for an optical system illustrated in FIG. 1A and FIG. 1B to be a so-called "45/0 optical system" in which light emitted from the light source 10 is obliquely incident on the object 200 at about 45 degrees and the light receiving element 60 receives light reflected from the object 200 in a vertical direction. However, no limitation to this configuration is provided, and for example, a so-called "0/45" optical system in which light emitted from the light source 10 is perpendicularly incident on the object 200 and the light receiving element 60 receives light reflected from the object 200 in a direction of 45 degrees or the like may be provided.

Here, a part having a function of one spectroscope optically may be referred to as a "spectrometric sensor" in the specification for the present application. The first imaging device 20, one opening of the oblique slit array 30, the second imaging device 40, the diffraction element 50, and an part of pixels of the light receiving element 60 that are a part corresponding to each measurement point compose one spectrometric sensor.

Thus, a spectral characteristic acquisition device according to the first embodiment uses a plurality of one-dimensional image capturing elements arranged in parallel to acquire a spectral characteristic. Thereby, it is possible to realize a spectral characteristic acquisition device capable of measuring a severalfold number of points in parallel while a high speed and a high precision are maintained, as compared with a conventional spectral characteristic acquisition device that uses one one-dimensional image capturing element to acquire a spectral characteristic.

Furthermore, it is possible to increase a range capable of being measured by one spectral characteristic acquisition device or increase a density of measurement points, which is industrially preferable.

Furthermore, it is possible to ensure a predetermined precision of a measurement by all of spectrometric sensors of a spectral characteristic acquisition device, because a characteristic of each spectrometric sensor that composes the spectral characteristic acquisition device is homogenized by using the first imaging device that have an image side telecentric characteristic.

Furthermore, it is possible to readily miniaturize a spectral characteristic acquisition device by using second imaging device configured to arrange a plurality of erecting equal-magnification imaging elements therein. As a result, it is possible to readily improve a stability of a spectral characteristic acquisition device against vibration or thermal expansion thereof, or the like.

Here, a spectral characteristic acquisition device described in International Publication No. 02/50783 may be suitable for using one line sensor but is not suitable for providing (arranging in parallel) a plurality of line sensors therein. That is because a diffraction image is formed in a direction oblique (for example, a direction at 45 degrees) with respect to a line sensor.

That is, because a diffraction axis of a spectral characteristic acquisition device described in International Publication No. 02/50783 is provided in an oblique direction, a position of a pixel for receiving one diffraction image is different for each of one-dimensional image capturing device. For that reason, a portion that is not capable of being used for acquisition of spectral information is provided at a peripheral portion of each of one-dimensional image capturing device, so that it is not possible to utilize pixels sufficiently.

On the other hand, because a direction of a diffraction axis of a spectral characteristic acquisition device according to the first embodiment is orthogonal to a direction of an array of one-dimensional image capturing device, a position of a pixel for capturing one diffraction image is common for respective one-dimensional image capturing device. For that reason, it is possible to use even edge portions of one-dimensional image capturing device for a detection of a spectral characteristic, which is more useful.

Furthermore, because a diffraction axis of a spectral characteristic acquisition device described in International Publication No. 02/50783 is provided in an oblique direction, an edge portion of a diffraction image intersects a pixel obliquely. As a result, an ineffective pixel is provided that is not capable of being utilized for a detection, because it is not possible for a pixel at an edge portion of a diffraction image to obtain a sufficient signal.

On the other hand, an edge portion of a diffraction image is provided in a direction identical to that of a boundary between pixels in a spectral characteristic acquisition device according to the first embodiment, it is possible for even a pixel at an edge portion of a diffraction image to obtain a sufficient signal, and it is possible to use more pixels for signal detection, which is useful.

Moreover, because a diffraction axis of a spectral characteristic acquisition device described in International Publication No. 02/50783 is provided in an oblique direction, it is necessary to adjust a width of an opening sequence or an inclination angle in view of the aforementioned ineffective pixel or the like in order to uniform spectral characteristics of pixels that are used in one spectrometric sensor, in a wavelength band to be detected. Furthermore, it is necessary to change at least an angle or a length of a diffraction image so that adjustment of an optical system for obtaining a predetermined characteristic is difficult.

On the other hand, in a spectral characteristic acquisition device according to the first embodiment, a wavelength band to be detected is adjusted by a position and a length of a diffraction image and the number of pixels to be used in one spectrometric sensor is adjusted by only a pitch of an opening sequence and a change of an inclination angle. Therefore, a modification or adjustment of an optical system for achieving a wavelength band or a precision depending on use or an application thereof is easy, which is industrially useful.

Second Embodiment

A second embodiment illustrates an example in which a diffraction element different from that of the first embodiment is used. Here, in the second embodiment, an identical reference numeral may be attached to a component identical to that of the embodiment described already, and a description thereof may be omitted.

FIG. 4A and FIG. 4B are cross-sectional diagrams that illustrate a spectral characteristic acquisition device according to the second embodiment, wherein FIG. 4A illustrates an X-Z cross section and FIG. 4B illustrates a Y-Z cross section. With reference to FIG. 4A and FIG. 4B, a spectral characteristic acquisition device 1A according to the second embodiment is different from the spectral characteristic acquisition device 1 according to the first embodiment (see FIG. 1A and FIG. 1B and the like) in that the diffraction element 50 is replaced by a stepwise diffraction element 50A.

A light beam that has passed through each opening 30a of the oblique slit array 30 is condensed at the second imaging device 40 again. Furthermore, a light beam that has passed through the second imaging device 40 is diffracted and spectrally dispersed by the stepwise diffraction element 50A in a direction of a Y-axis. A diffraction image that has been diffracted and spectrally dispersed by the stepwise diffraction element 50A in a direction of a Y-axis is imaged onto the light receiving element 60 in which three one-dimensional line sensors are provided in parallel. Here, the stepwise diffraction element 50A is one representative example of spectrally dispersing device according to an embodiment of the present invention.

Figure 5:
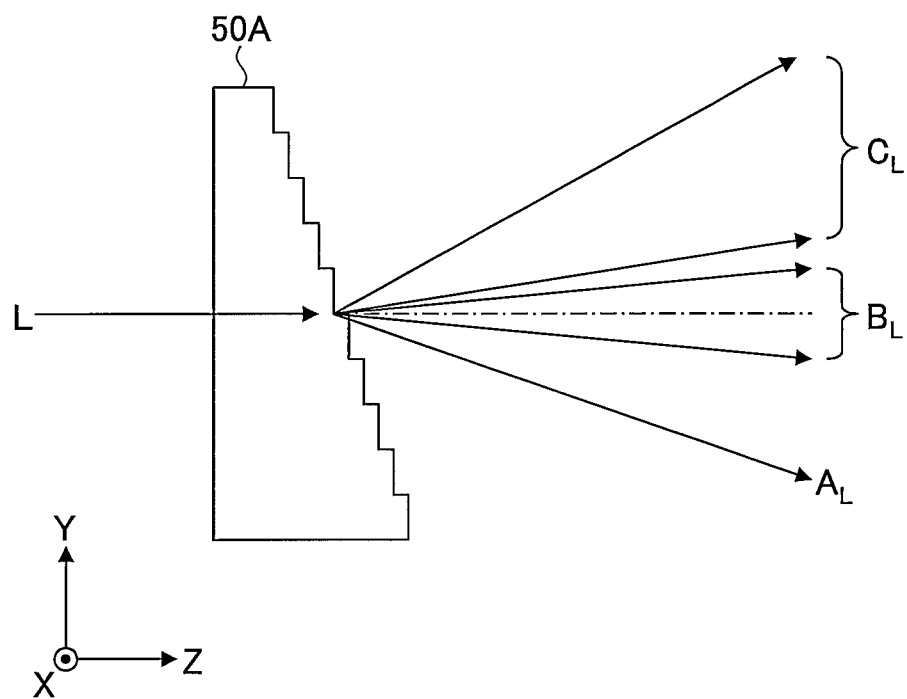
FIG. 5 is a diagram that illustrates a stepwise diffraction element.

FIG. 5 is a diagram that illustrates a stepwise diffraction element. The stepwise diffraction element 50A is a kind of a blazed diffraction grating wherein all of blazed surfaces are orthogonal to an optical axis thereof and predetermined steps are formed at a predetermined pitch on a surface at an opposite side of an entrance surface. It is also considered that this is a combination of a blazed diffraction grating and a prism.

It is possible for the stepwise diffraction element 50A to output first order diffraction light $B_L$ with a predetermined wavelength in parallel to a light axis of incident light L by appropriately selecting a pitch and a step of a grating. Here, in FIG. 5, $A_L$ denotes zeroth order diffraction light and $C_L$ denotes second order diffraction light.

The diffraction grating 50 that is general as provided in the first embodiment is such that a chief ray of first order diffraction light has a predetermined angle with respect to an optical axis thereof. For that reason, for example, as positions of three pixel lines that compose the light receiving element 60 in a direction of a Z-axis are adjusted at a time of assembly of an optical system, a position of a first order diffraction image in a direction of a Y-axis is changed accordingly, and hence, it is necessary to adjust two axis simultaneously.

On the other hand, in a case where the stepwise diffraction element 50A as provided in the present embodiment is used, a first order diffraction image is not changed in a direction of a Y-axis even when, for example, positions of three pixel lines that compose the light receiving element 60 in a direction of a Z-axis are adjusted for assembly of an optical system, so that it is possible to readily conduct adjustment, which is preferable.

Furthermore, it is possible to obtain predetermined order diffraction light in parallel to an optical axis by using the stepwise diffraction element 50A. That is, a diffraction efficiency of first order diffraction light with a predetermined wavelength or a wavelength in the neighborhood thereof is improved whereas a diffraction efficiency for another order is reduced. Therefore, it is preferable for speeding up of the spectral characteristic acquisition device 1A, because it is possible to increase an amount of light incident on three pixel lines that compose the light receiving element 60 and it is possible to obtain a sufficient signal from a pixel at a less amount of light exposure time.

Moreover, diffraction light with an order other than a first order is reduced to decrease a stray light component that degrades a precision of a measurement, so that it is possible to conduct a measurement at a higher precision. Furthermore, adjustment of an optical system at a time of assembly of the spectral characteristic acquisition device 1A or the like is facilitated.

Here, because a diffraction axis of a spectral characteristic acquisition device described in International Publication No. 02/50783 is provided in an oblique direction, the number of grooves of a diffraction grating that has a long effective area in a direction of an array of spectrometric sensors is predominantly more than that of the present embodiment. Therefore, if a stepwise diffraction element is used as provided in the present embodiment, a height of a diffraction grating in a direction of an optical axis is predominantly increased by a step thereof, and hence, it is not possible to use this practically.

On the other hand, because the number of grooves of a diffraction grating in a spectral characteristic acquisition device according to the second embodiment is small, it is possible to use a stepwise diffraction element as described above.

Third Embodiment

A third embodiment illustrates an example of an introduction of a cylindrical lens into an optical system of a spectral characteristic acquisition device. Here, in the third embodiment, an identical reference numeral may be attached to a component identical to that of the embodiment described already, and a description thereof may be omitted.

FIG. 6A and FIG. 6B are cross-sectional diagrams that illustrate a spectral characteristic acquisition device according to the third embodiment, wherein FIG. 6A illustrates an X-Z cross section and FIG. 6B illustrates a Y-Z cross section. With reference to FIG. 6A and FIG. 6B, a spectral characteristic acquisition device 1B according to the third embodiment is different from the spectral characteristic acquisition device 1 according to the first embodiment (see FIG. 1A and FIG. 1B and the like) in that a cylindrical lens is inserted in front of the oblique slit array 30.

Light (a light beam) reflected from the measurement area 200a of the object 200 is imaged by the first imaging device 20, and is incident on the oblique slit array 30 after a predetermined astigmatism caused by a cylindrical lens 70 is provided thereto. Here, the cylindrical lens 70 is one representative example of one directional imaging device according to an embodiment of the present invention.

In a Y-Z cross section illustrated in FIG. 6B, the object 200 and the oblique slit array 30 are provided in a conjugate relation due to a lens system that is composed of the first imaging device 20 and the cylindrical lens 70. On the other hand, in an X-Z cross section illustrated in FIG. 6A, an arrangement that deviates from a conjugate relation is provided because astigmatism is provided by the cylindrical lens 70.

In the spectral characteristic acquisition device 1B, it is desirable for a spectral characteristic of a light beam that passes through each opening 30b of the oblique slit array 30 to be constant. For example, as a color of the object 200 at corresponding positions is different between at a right edge and a left edge of each opening 30b, a difference is provided in a spectral characteristic of a passing light beam and a precision of a measurement is degraded.

In a case where sensing of the object 200 to be conveyed is conducted in the spectral characteristic acquisition device 1B, the light receiving element 60 is exposed to light for a predetermined finite period of time and converts a light signal to an electric signal. The object 200 is moved during an exposure time in a direction of a Y-axis that is a direction of conveyance, and then, information of light that passes through the measurement area 200a is integrated and stored.

That is, a difference of a spectral characteristic between a right edge and a left edge of the aforementioned slit is reduced sufficiently, because there is an effect of a moving average in a direction of a Y-axis. Therefore, it is desirable to provide an effect of averaging to an optical system in only a direction of an X-axis. It is possible to realize this matter by providing astigmatism due to the cylindrical lens 70 or the like.

Thus, astigmatism is provided to a light beam incident on the oblique slit array 30 by using the cylindrical lens 70, so that it is possible to provide an effect of an optical averaging in only a direction of an array of respective openings 30b of the oblique slit array 30.

Thereby, a spectral characteristic of a light beam in each opening 30b of the oblique slit array 30 is generally uniform, and it is possible to improve a stability of the spectral characteristic acquisition device 1B. Because each measurement point outputs a color averaged in a predetermined range, it is possible to acquire spectral information stably at, for example, even a color boundary or the like.

Fourth Embodiment

A fourth embodiment illustrates an example of an introduction of a color filter array into an optical system of a spectral characteristic acquisition device. Here, in the fourth embodiment, an identical reference numeral may be attached to a component identical to that of the embodiment described already, and a description thereof may be omitted.

FIG. 7A and FIG. 7B are cross-sectional diagrams that illustrate a spectral characteristic acquisition device according to the fourth embodiment, wherein FIG. 7A illustrates an X-Z cross section and FIG. 7B illustrates a Y-Z cross section. With reference to FIG. 7A and FIG. 7B, a spectral characteristic acquisition device 10 according to the fourth embodiment is different from the spectral characteristic acquisition device 1 according to the first embodiment (see FIG. 1A and FIG. 1B and the like) in that a color filter array 80 is inserted in front of the light receiving element 60.

The color filter array 80 is such that respective color filters with different spectral transmittances are arranged just in front of three pixel lines of the light receiving element 60. Respective color filters are band-pass filters that transmit mutually different wavelength bands. That is, a color line sensor is composed of the color filter array 80 and three pixel lines of the light receiving element 60.

Here, a color line sensor that is a combination of R, G, and B color filters and three line sensors is comparatively inexpensive in market and readily available.

A light beam that has passed through each opening 30b of the oblique slit array 30 is condensed by the second imaging device 40 again. Furthermore, a light beam that has passed through the second imaging device 40 is diffracted and spectrally dispersed by the diffraction element 50 in a direction of a Y-axis. A diffraction image that has been diffracted and spectrally dispersed by the diffraction element 50 in a direction of a Y-axis transmits through the color filter array 80 and is imaged on each pixel line of the light receiving element 60. Here, the color filter array 80 is one representative example of wavelength band limitation device according to an embodiment of the present invention.

Because a spectrometric sensor generally uses an imaging lens, a diffraction element, or the like, a stray light component may be generated by multiple reflection or the like. As any stray light is incident on each pixel line of the light receiving element 60, a precision of a measurement is caused to be degraded.

Because spectral dispersion is provided in a direction of a Y-axis in the spectral characteristic acquisition device 10, it is possible for respective pixel liens of the light receiving element 60 to detect amounts of light with mutually different wavelength bands. Then, a broad band color filter that transmits each wavelength band is placed just in front of each pixel line of the light receiving element 60, so that it is possible to reduce a component outside a predetermined wavelength band among stray light components and it is possible to suppress degradation of a precision of a measurement that is caused by such a stray light component.

Fifth Embodiment

A fifth embodiment illustrates an example of an introduction of a light diffuser plate into an optical system of a spectral characteristic acquisition device. Here, in the fifth embodiment, an identical reference numeral may be attached to a component identical to that of the embodiment described already, and a description thereof may be omitted.

Figure 8A:
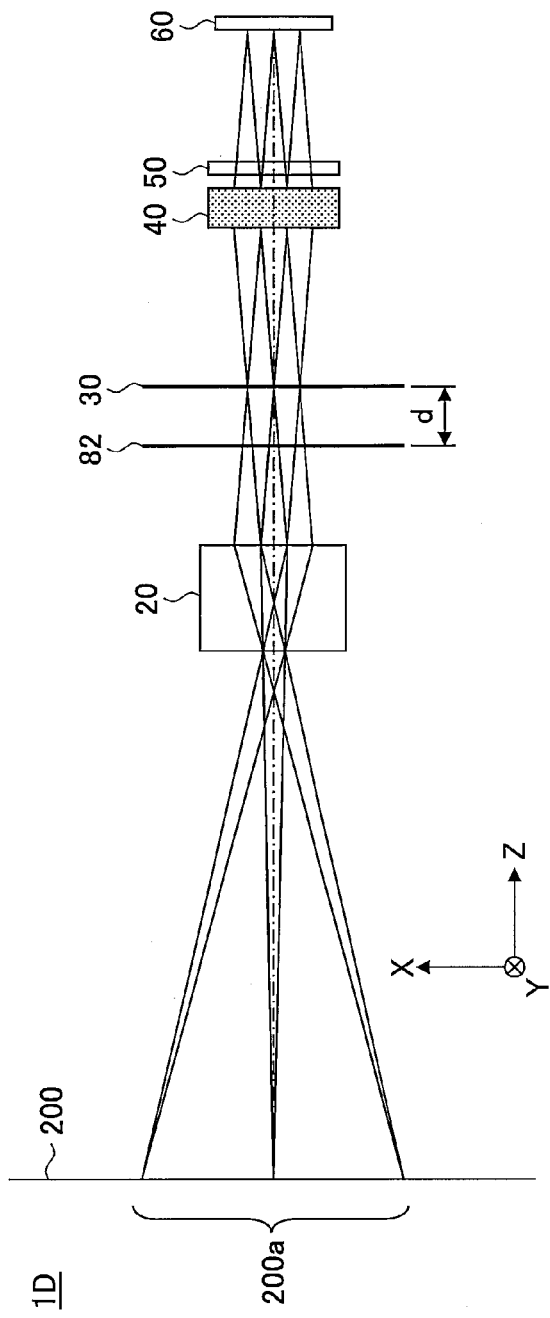
FIG. 8A and FIG. 8B are cross-sectional diagrams that illustrate a spectral characteristic acquisition device according to a fifth embodiment.
Figure 8B:
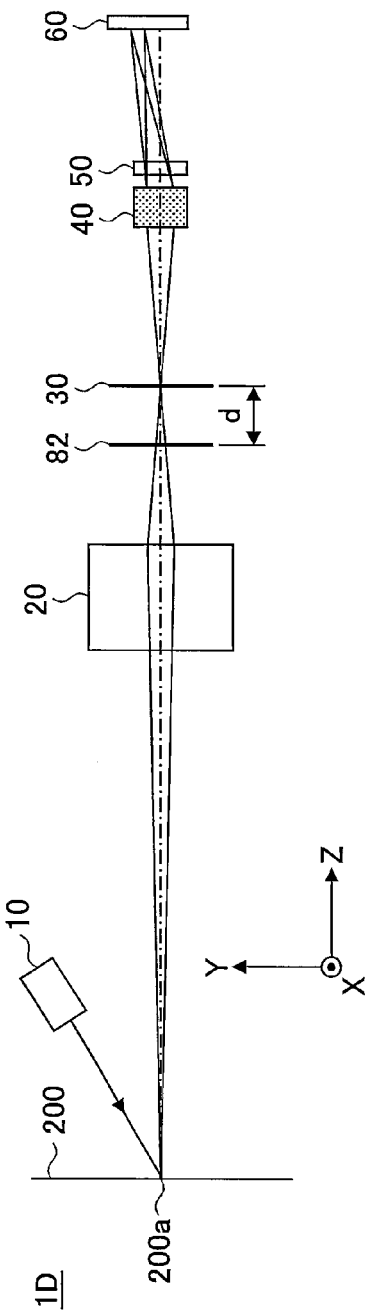

FIG. 8A and FIG. 8B are cross-sectional diagrams that illustrate a spectral characteristic acquisition device according to the fifth embodiment, wherein FIG. 8A illustrates an X-Z cross section and FIG. 8B illustrates a Y-Z cross section. With reference to FIG. 8A and FIG. 8B, a spectral characteristic acquisition device 1D according to the fifth embodiment is different from the spectral characteristic acquisition device 1 according to the first embodiment (see FIG. 1A and FIG. 1B and the like) in that a light diffuser plate 82 is inserted in front of the oblique slit array 30.

The light diffuser plate 82 has a function of diffusing and transmitting therethrough a light beam. It is desirable for the light diffuser plate 82 to diffuse light due to an effect of a surficial micro concavoconvex lens to provide a high transmittance and a stable diffusion characteristic at an arbitrary position on the light diffuser plate 82. For a specific example of the light diffuser plate 82, it is possible to provide Light Shaping Diffuser of Luminit, LLC.

It is possible to arrange the light diffuser plate 82 between the first imaging device 20 and the oblique slit array 30 and away from the oblique slit array 30 by a distance d. In this case, a light beam coming from an arbitrary point on the measurement area 200a irradiates a predetermined range determined by a light distribution angle of orientation and the distance d on the oblique slit array 30. Therefore, a light beam coming from a predetermined area determined by a light distribution angle, the distance d, and a reduction ratio (magnification) of a lens on the measurement area 200a arrives at an arbitrary point on the oblique slit array 30. Here, the light diffuser plate 82 is one representative example of diffusion device according to an embodiment of the present invention.

Herein, it is desirable for the first imaging device 20 to have at least an image side telecentric characteristic. A chief ray of a light beam that transmits through the light diffuser plate 82 is generally parallel to an optical axis by having an image side telecentric characteristic. The light diffuser plate 82 is such that a diffusion characteristic thereof is changed depending on an incident angle, and hence, it is preferable for a positional dependence of an inclination of a chief ray to be small due to an image side telecentric characteristic so that a diffusion characteristic is uniform over positions.

Thus, the light diffuser plate 82 with an appropriate light orientation characteristic is placed at an appropriate position in front of the oblique slit array 30 in a spectral characteristic acquisition device according to the fifth embodiment. Thereby, it is possible to provide an appropriate optical averaging effect and it is possible to suppress degradation of a precision of a measurement at a portion where a spectral characteristic is suddenly changed in a surface to be measured and acquire a spectral characteristic at a high precision.

Furthermore, the light diffuser plate 82 is used so that a positional adjustment in a direction of an X-axis or a direction of a Y-axis or a positional adjustment of a rotation around a Z-axis is not required, and it is possible to provide an assembly more easily and also a little influence of a thermal expansion or a variation with time, so that it is possible to provide a more stable spectral characteristic acquisition device, which is industrially preferable.

Variation Example 1 of the Fifth Embodiment

Variation example 1 of the fifth embodiment illustrates an example of an introduction of an elliptical light diffuser plate into an optical system of a spectral characteristic acquisition device. Here, in variation example 1 of the fifth embodiment, an identical reference numeral may be attached to a component identical to that of the embodiment described already, and a description thereof may be omitted.

In the spectral characteristic acquisition device 1 illustrated in FIG. 8A and FIG. 8B, an elliptical diffuser plate that provides a light distribution angle in a direction of an X-axis greater than that in a direction of a Y-axis may be used as the light diffuser plate 82. In a case of a diffuser plate that conducts diffusion by using an effect of a surficial micro concavoconvex lens, it is possible to provide this micro concavoconvex one with an anisotropy to provide a light distribution angle with an anisotropy.

Figure 9A:
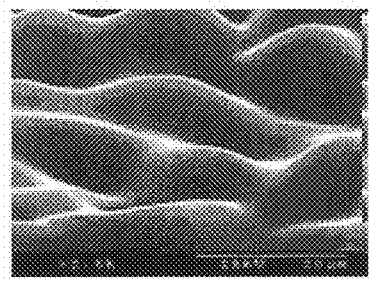
FIG. 9A and FIG. 9B are pictures that illustrate a light diffuser plate in which there is not an anisotropy of a micro irregularity on a surface thereof.
Figure 9B:
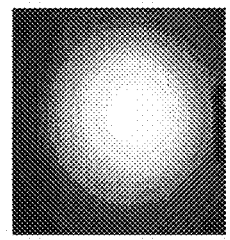
Figure 10A:
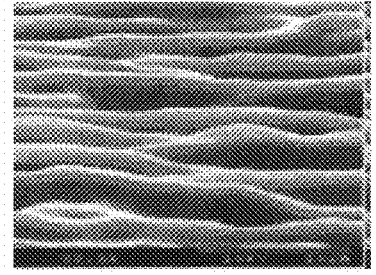
FIG. 10A and FIG. 10B are pictures that illustrate a light diffuser plate in which there is an anisotropy of a micro irregularity on a surface thereof.
Figure 10B:
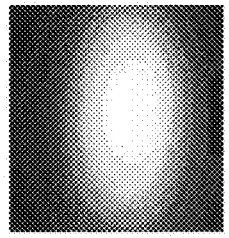

FIG. 9A illustrates and enlarges a light diffuser plate with no surficial micro concavoconvex anisotropy. In this case, a light distribution angle also has no anisotropy and a light beam is diffused generally circularly as illustrated in FIG. 9B. On the other hand, FIG. 10A illustrates and enlarges a light diffuser plate with a surficial micro concavoconvex anisotropy (elliptical light diffuser plate). In this case, a light distribution is also different between a longitudinal and transverse directions and a light beam is diffused generally elliptically as illustrated in FIG. 10B.

For example, in a case where the object 200 that is an object to be measured is conveyed in a direction of a Y-axis at a constant speed and a spectral characteristic is acquired continuously in the spectral characteristic acquisition device 1D, an averaging effect due to a finite light exposure time is provided in a direction of a Y-axis but it is not provided in a direction of an X-axis. In this case, as a generally circular light diffuser plate is used, an averaging effect due to a moving average in addition to an optical averaging effect due to a light diffuser late is provided in a direction of a Y-axis, and hence, an acquired spectral characteristic is an average spectral characteristic in an elliptical range longer in a direction of a Y-axis.

Then, an elliptical diffuser plate is used as the light diffuser plate 82 and arranged in such a manner that a light distribution angle in a direction of an X-axis (first direction) of the elliptical diffuser plate is greater than a light distribution angle in a direction of a Y-axis (second direction orthogonal to the first direction). As a result, it is possible for an acquired spectral characteristic to be an average spectral characteristic in a rage closer to a circle. That is, while an effect of a moving average that is present in a direction of conveyance of an object to be measured is taken into consideration, it is possible to provide a more stable spectral characteristic acquisition device in which a characteristic in a measurement range is homogenized in a direction of acquisition of a spectral information.

Variation Example 2 of the Fifth Embodiment

Variation example 2 of the fifth embodiment illustrates an example of formation of a light diffuser plate and an oblique slit array on front and back surfaces of a substrate. Here, in variation example 2 of the fifth embodiment, an identical reference numeral may be attached to a component identical to that of the embodiment described already, and a description thereof may be omitted.

FIG. 11A and FIG. 11B are cross-sectional diagrams that illustrate a spectral characteristic acquisition device according to variation example 2 of the fifth embodiment, wherein FIG. 11A illustrates an X-Z cross section and FIG. 11B illustrates a Y-Z cross section. With reference to FIG. 11A and FIG. 11B, a spectral characteristic acquisition device 1E according to variation example 2 of the fifth embodiment is different from the spectral characteristic acquisition device 1D according to the fifth embodiment (see FIG. 8A and FIG. 8B) in that a substrate 85 is added thereto.

In the spectral characteristic acquisition device 1E, the light diffuser plate 82 is formed on an entrance surface of the substrate 85 and the oblique slit array 30 is formed on an exit surface of the substrate 85. For the substrate 85, it is possible to use, for example, a glass substrate, a plastic substrate, or the like. However, the light diffuser plate 82 and the oblique slit array 30 may be formed mutually different substrates and they may be bonded together.

A characteristic of an optical averaging effect of the light diffuser plate 82 is determined by a light distribution angle depending on a surficial micro concavoconvex shape or the like and a distance from the oblique slit array 30. Then, as the light diffuser plate 82 and the oblique slit array 30 are formed and integrated on an entrance surface and an exit surface of the substrate 85 with an appropriate thickness, a process of adjustment for positioning the light diffuser plate 82 at a time of placing thereof is not required and a manufacturing process is simplified. Furthermore, because an influence of a thermal expansion, a variation with time, or the like is sufficiently reduced, it is possible to provide a more inexpensive and more stable spectral characteristic acquisition device, which is industrially preferable.

Sixth Embodiment

A sixth embodiment illustrates an example of an image evaluation device that has a spectral characteristic acquisition device. Here, in the sixth embodiment, an identical reference numeral may be attached to a component identical to that of the embodiment described already, and a description thereof may be omitted.

Figure 12:
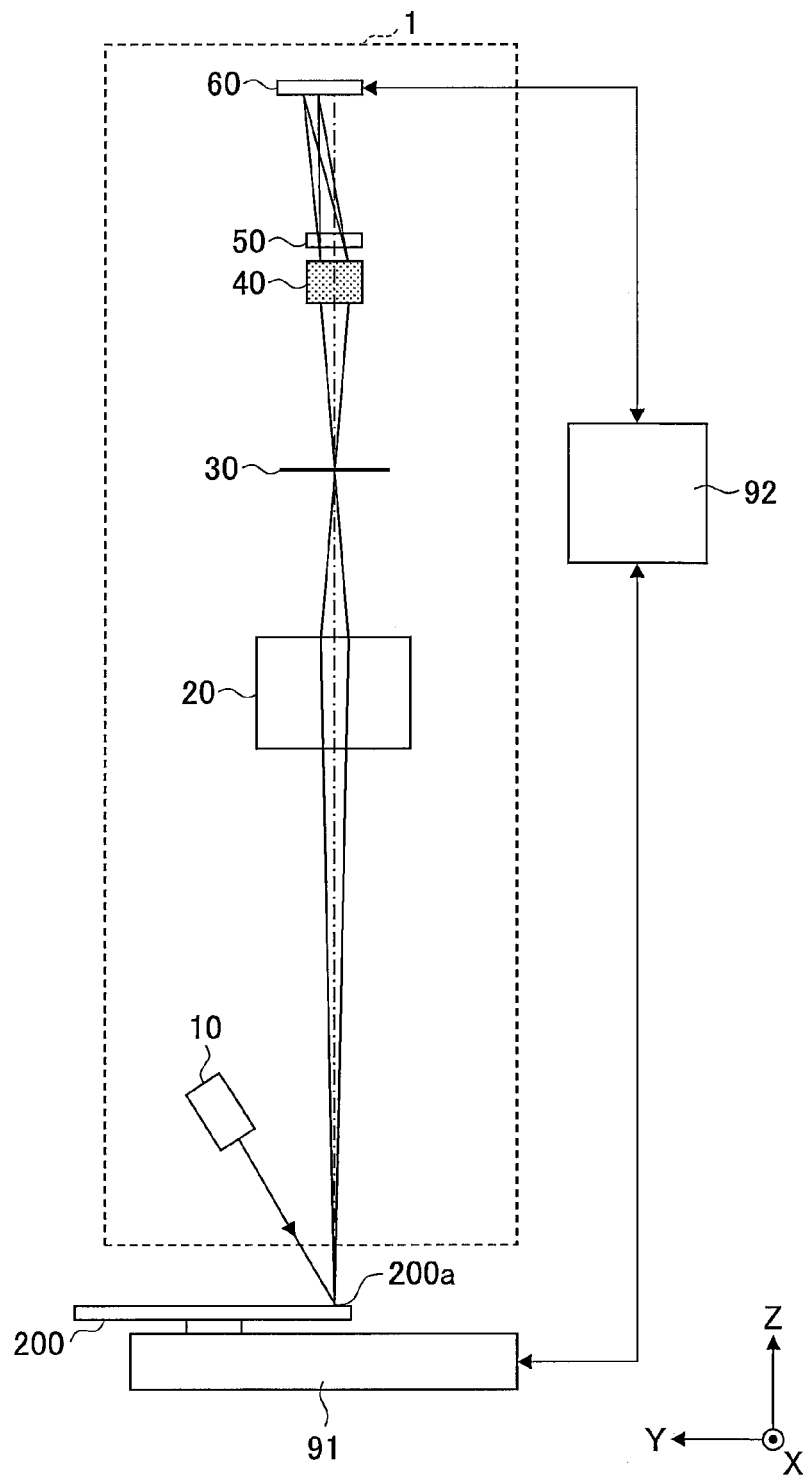
FIG. 12 is a diagram that illustrates an image evaluation device according to a sixth embodiment.

FIG. 12 is a diagram that illustrates an image evaluation device according to the sixth embodiment. With reference to FIG. 12, an image evaluation device 90 has the spectral characteristic acquisition device 1, conveyance device 91, and image evaluation device 92. The conveyance device 91 have a function of conveying the object 200 with the measurement area 200a in a direction of a Y-axis.

The image evaluation device 92 controls the conveyance device 91 and the spectral characteristic acquisition device 1 so as to operate both of them cooperatively. Then, a spectral characteristic of an entire surface of the object 200 is acquired, for example, based on signal from total twelve pixels of three pixel lines for receiving a signal of each first order diffraction image B that corresponds to each opening 30b of the oblique slit array 30 (see FIG. 3).

Furthermore, a result of colorimetry such as tristimulus values XYZ or CIELAB is calculated based on an acquired spectral characteristic to evaluate the colors of an image formed of a plurality of colors on the object 200.

Here, the image evaluation device 92 include, for example, a CPU, a ROM, a main memory, and the like, and a program recorded in the ROM or the like is read in the main memory and executed by the CPU so that it is possible to realize each kind of function of the image evaluation device 92. However, a part or all of the image evaluation device 92 may be realized by only hardware. Furthermore, the image evaluation device 92 may be physically composed of a plurality of devices.

Due to such a configuration, it is possible for the image evaluation device 90 to acquire, a spectral characteristic, for example, information of a color, at a plurality of positions on the object 200 with, for example, a printed image formed thereon, based on information of a speed from an encoder sensor that has already been known or is mounted on (not-illustrated) conveyance device, or the like.

Here, in FIG. 12, it is sufficient for the conveyance device 91 to relatively move the object 200 and the spectral characteristic acquisition device 1 in a predetermined direction (a direction of a Y-axis in case of FIG. 12). Then, although the spectral characteristic acquisition device 1 is fixed and the object 200 is moved by the conveyance device 91 in FIG. 12, the object 200 may be fixed and the spectral characteristic acquisition device 1 may be moved, differently from FIG. 12.

Furthermore, in a case where it is possible to curve the object 200, for example, a paper sheet, the conveyance device 91 may be configured, for example, in such a manner that the object 200 is attached to a surface of a rotating drum and subsequently rotated thereby.

Thus, according to the sixth embodiment, it is possible to realize an image evaluation device capable of evaluating a spectral characteristic of an entire surface of an object singly. That is, because it is possible to measure a spectral characteristic or a color at an arbitrary position in an image of the object 200, it is possible to evaluate a color irregularity on a surface of the object 200, a difference between colors at a plurality of predetermined positions on the object 200, or the like.

For example, in a case where the object 200 is a print, a print is periodically sampled during printing and evaluated by the image evaluation device 90, so that it is possible to monitor a color change in a printing process and it is possible to conduct adjustment of a printing process or the like based thereon.

Seventh Embodiment

A seventh embodiment illustrates an example of an image formation apparatus that has an image evaluation device according to the sixth embodiment. Here, in the seventh embodiment, an identical reference numeral may be attached to a component identical to that of the embodiment described already, and a description thereof may be omitted.

Figure 13:
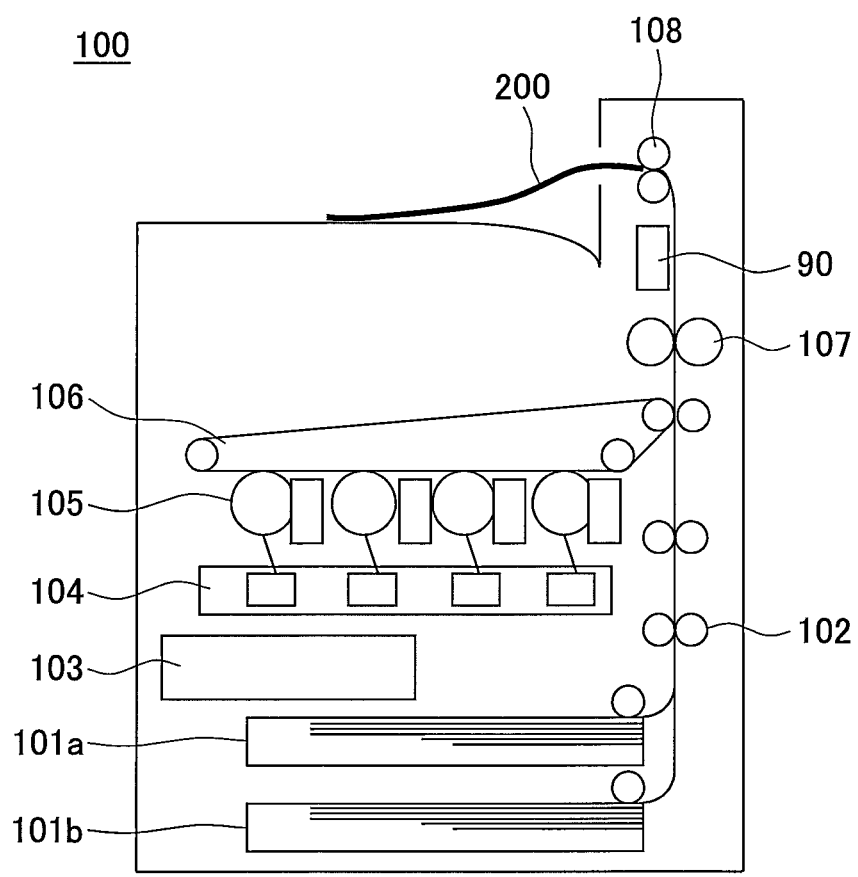
FIG. 13 is a diagram that illustrates an image formation apparatus according to a seventh embodiment.

FIG. 13 is a diagram that illustrates an image formation apparatus according to the seventh embodiment. With reference to FIG. 13, an image formation apparatus 100 has the image evaluation device 90, paper feeding cassettes 101a and 101b, a paper feeding roller 102, a controller 103, a scanning optical system 104, a photoconductor body 105, an intermediate transfer body 106, a fixation roller 107, and a paper ejection roller 108. The image formation apparatus 100 is, for example, an electrophotographic-type or an ink-jet-type full-color image formation apparatus or the like.

In the image formation apparatus 100, the object 200 conveyed from the paper feeding cassettes 101a and 101b by a non-illustrated guide and the paper feeding roller 102 is light-exposed by the scanning optical system 104 and a coloring material is provided onto the photoconductor body 105 for development. A developed image transfers onto the intermediate transfer body 106, and then, transfers from the intermediate body 106 onto the object 200.

An image having transferred on the object 200 is fixed by the fixation roller 107 and the object 200 with an image formed thereon is ejected by the paper ejection roller 108. The image evaluation device 90 is placed in back of the fixation roller 107.

Thus, according to the seventh embodiment, it is possible to measure the object 200 after image formation (an image after printing thereof) inline and realize an image formation apparatus capable of adjusting a printing process based thereon. That is, the image evaluation device 90 provided with the spectral characteristic acquisition device 1 is installed at a predetermined position of the image formation apparatus 100, so that it is possible to acquire a spectral characteristic at an arbitrary position of an image after printing thereof.

Furthermore, it is possible to calculate a result of colorimetry such as tristimulus values XYZ or CIELAB based on an acquired spectral characteristic. Therefore, it is possible to monitor a printing process by using a result of colorimetry from an arbitrary image, stopping printing thereof in a case where there is a change therein, or adjusting a printing process in such a manner that a change in the printing process is canceled, and it is possible to stably produce an image with a more accurate color.

Although preferred embodiments have been described above in detail, it is possible to apply a variety of modifications and substitutions to the embodiments described above without being limited to the embodiments described above and without departing from the scope recited in what is claimed.

For example, it is possible to combine respective embodiments appropriately. However, both a cylindrical lens and a light diffuser plate are not simultaneously used in a single optical system.

APPENDIX

<An Illustrative Embodiment(s) of a Spectral Characteristic Acquisition Device, an Image Evaluation Device, and an Image Formation Apparatus>

At least one illustrative embodiment of the present invention may relate to at least one of a spectral characteristic acquisition device, an image evaluation device, and an image formation apparatus.

An object of at least one illustrative embodiment of the present invention may be to provide a spectral characteristic acquisition device capable of measuring a broader range at a higher density.

At least one illustrative embodiment of the present invention may be a spectral characteristic acquisition device that has an opening sequence in which a plurality of openings through which light beams from a plurality of positions on an object pass are arrayed in a predetermined direction and a direction in which each of the openings is inclined with respect to the predetermined direction is a longitudinal direction, spectrally dispersing device that spectrally disperse light beams passing through the openings in a direction orthogonal to the predetermined direction, plurality-of-lines image capturing device in which one-dimensional image capturing device for which a plurality of pixels are arrayed in a direction parallel to the predetermined direction are provided at a predetermined interval in a plurality of lines, wherein light beams that are spectrally dispersed by the spectrally dispersing device irradiate all of a plurality of the one-dimensional image capturing device.

Illustrative Embodiment (1) is a spectral characteristic acquisition device having an opening sequence in which a plurality of openings through which light beams from a plurality of positions on an object pass are arrayed in a predetermined direction and a direction in which each of the openings is inclined with respect to the predetermined direction is a longitudinal direction, spectrally dispersing device that spectrally disperse light beams passing through the openings in a direction orthogonal to the predetermined direction, plurality-of-lines image capturing device in which one-dimensional image capturing device for which a plurality of pixels are arrayed in a direction parallel to the predetermined direction are provided at a predetermined interval in a plurality of lines, wherein light beams that are spectrally dispersed by the spectrally dispersing device irradiate all of a plurality of the one-dimensional image capturing device.

Illustrative Embodiment (2) is the spectral characteristic acquisition device as described in Illustrative Embodiment (1), which has first imaging device that image the light beams from a plurality of positions on an object onto the opening sequence, wherein the first imaging device have an image side telecentric characteristic.

Illustrative Embodiment (3) is the spectral characteristic acquisition device as described in Illustrative Embodiment (1) or (2), which has second imaging device that image light beams passing through the opening sequence onto the plurality-of-lines image capturing device, wherein the second imaging device are configured in such a manner that a plurality of erecting equal-magnification imaging elements are arrayed.

Illustrative Embodiment (4) is the spectral characteristic acquisition device as described in any one of Illustrative Embodiments (1) to (3), wherein the spectrally dispersing device are a stepwise diffraction element.

Illustrative embodiment (5) is the spectral characteristic acquisition device as described in any one of Illustrative Embodiments (1) to (4), wherein one-directional imaging device that generate a predetermined astigmatism are arranged in front of the opening sequence.

Illustrative Embodiment (6) is the spectral characteristic acquisition device as described in any one of Illustrative Embodiments (1) to (4), wherein diffusion device that diffuse light beams within predetermined light distribution angles are arranged in front of the opening sequence.

Illustrative Embodiment (7) is the spectral characteristic acquisition device as described in Illustrative Embodiment (6), wherein the diffusion device are such that a light distribution angle in a first direction is greater than a light distribution angle in a second direction orthogonal to the first direction.

Illustrative Embodiment (8) is the spectral characteristic acquisition device as described in Illustrative Embodiment (6) or (7), wherein the diffusion device are integrated with the opening sequence.

Illustrative Embodiment (9) is the spectral characteristic acquisition device as described in any one of Illustrative Embodiments (1) to (8), wherein wavelength band limitation device that transmit different wavelength bands are arranged in front of each of the one-dimensional image capturing device.

Illustrative embodiment (10) is an image evaluation device having the spectral characteristic acquisition device as described in any one of Illustrative Embodiments (1) to (9), conveyance device that relatively move the spectral characteristic acquisition device and the object, and image evaluation device that cooperatively operate the spectral characteristic acquisition device and the conveyance device to acquire a spectral characteristic of an entire surface of the object.

Illustrative embodiment (11) is an image formation apparatus provided with the image evaluation device as described in Illustrative Embodiment (10).

According to at least one illustrative embodiment of the present invention, it may be possible to provide a spectral characteristic acquisition device capable of measuring a broader range at a higher density.

Although the illustrative embodiment(s) and specific example(s) of the present invention have been described with reference to the accompanying drawing(s), the present invention is not limited to any of the illustrative embodiment(s) and specific example(s), and the illustrative embodiment(s) and specific example(s) may be altered, modified, or combined without departing from the scope of the present invention.

The present application is based on and claims the benefit of priority to Japanese Patent Application No. 2013-099855 filed on May 10, 2013 and Japanese Patent Application No. 2013-220109 filed on Oct. 23, 2013, the entire contents of which are herein incorporated by reference.

What is claimed is:

1. A spectral characteristic acquisition device, comprising:
    an oblique slit array that has a plurality of openings arrayed in a predetermined direction, each of the plurality of openings inclined with respect to the predetermined direction, the plurality of openings being configured to pass light beams from a plurality of positions on an object therethrough;
    a diffractor that spectrally disperses the light beams having passed through the plurality of openings in a direction orthogonal to the predetermined direction; and
    a plurality of one-dimensional light receiving devices provided at a predetermined interval in a plurality of lines and configured to be irradiated with the light beams having been spectrally dispersed by the diffracting device, a plurality of pixels of the plurality of one-dimensional light receiving devices being arrayed in a direction parallel to the predetermined direction; and
    a light diffuser plate that diffuses the light beams within a predetermined light distribution angle and provided in front of the oblique slit array.

2. The spectral characteristic acquisition device as claimed in claim 1, further comprising:
    an imaging device that includes a lens to image the light beams from the plurality of positions on the object onto the plurality of openings and has an image side telecentric characteristic.

3. The spectral characteristic acquisition device as claimed in claim 1, further comprising:
    an imaging device that images the light beams having passed through the plurality of openings onto the plurality of one-dimensional light receiving devices and includes an array of a plurality of gradient index lenses.

4. The spectral characteristic acquisition device as claimed in claim 1, wherein the diffractor is a stepwise diffraction element.

5. The spectral characteristic acquisition device as claimed in claim 1, further comprising:
    a cylindrical lens that generates a predetermined astigmatism and provided in front of the oblique slit array.

6. The spectral characteristic acquisition device as claimed in claim 1, wherein the light distribution angle in a first direction is different from the light distribution angle in a second direction orthogonal to the first direction.

7. The spectral characteristic acquisition device as claimed in claim 1, wherein the light diffuser plate that diffuses is integrated with the oblique slit array.

8. The spectral characteristic acquisition device as claimed in claim 1, further comprising:
    a color filter array configured to limit wavelength bands of the light beams transmitting therethrough and provided in front of each of the plurality of one-dimensional light receiving devices.

9. The spectral characteristic acquisition device as claimed in claim 1, wherein the diffractor spectrally disperses the light beams in a direction orthogonal to a direction in which the plurality of pixels are aligned at each of the plurality of one-dimensional light receiving devices.

10. An image evaluation device, comprising:
    the spectral characteristic acquisition device as claimed in claim 1;
    a conveyor that moves at least one of the spectral characteristic acquisition device and the object;
    a memory that stores a program; and
    a processor that executes the program to cooperate the spectral characteristic acquisition device with the conveyor to acquire a spectral characteristic of an entire surface of the object.

11. An image formation apparatus, comprising:
    a photoconductor body;
    a scanning optical system configured to expose the photoconductor body to light to form an image on the photoconductor body;
    a transfer body configured to transfer the image from the photoconductor body to an object;
    a fixation roller that fixes the image on the object; and
    the image evaluation device as claimed in claim 10 being provided in back of the fixation roller.

* * * * *